United States Patent [19]

Fields et al.

[11] 4,113,138

[45] Sep. 12, 1978

[54] LIQUID TANK CAP HAVING A VENT

[75] Inventors: Ernest E. Fields, Shreveport, La.; Lester W. Reineck, Round Lake, Ill.

[73] Assignee: Outboard Marine Corporation, Waukegan, Ill.

[21] Appl. No.: 823,614

[22] Filed: Aug. 11, 1977

[51] Int. Cl.$^2$ .................. B65D 3/00; B65D 51/16; B65D 55/16

[52] U.S. Cl. .................. 220/367; 220/86 R; 220/375; 220/360; 220/361

[58] Field of Search .............. 220/86 R, 303, 360, 220/361, 367, 369, 373, 374, 375, 205, 206, 208

[56] References Cited

U.S. PATENT DOCUMENTS

| | | | |
|---|---|---|---|
| 1,735,132 | 11/1929 | Schlaich | 220/375 X |
| 3,064,668 | 11/1962 | Alkire et al. | 220/367 X |
| 3,317,079 | 5/1967 | Ferrell et al. | 220/367 X |
| 3,715,049 | 2/1973 | McMullen et al. | 220/367 X |

Primary Examiner—William Price
Assistant Examiner—Steven M. Pollard
Attorney, Agent, or Firm—Michael, Best & Friedrich

[57] ABSTRACT

Disclosed herein is a cap for a liquid tank having a filler neck, such as a fuel tank for an outboard motor, which cap includes a hollow body having a top wall portion for closing the filler neck and a depending annular flange for releasably engaging the filler neck. The interior of the tank is vented to the atmosphere through one or more vent ports located in the top wall portion and the vent port(s) is selectively opened and closed by a closure member including a shank threadably mounted on the top wall portion and a cover portion for opening and closing the vent port when the closure member is turned in opposite directions. A dish-shaped baffle disposed inside the cap body in spaced relationship to the top wall portion serves a baffle to minimize spillage of fuel through the vent port(s) and also defines a chamber for collecting fuel which otherwise might leak through the vent port(s) and for draining the collected fuel back into the fuel tank when the motor or tank is in an upright operating position.

In one embodiment, unintentional complete detachment of the cap from the fuel tank is prevented by a cap retainer including an elongated stem having an upper end connected to the inner end of the closure member shank and a transversely extending member having a length greater than the inside dimension of the filler neck and connected to the lower end of the stem. All of the parts of the cap, except the diaphragm, preferably are molded from a synthetic thermoplastic material.

19 Claims, 2 Drawing Figures

LIQUID TANK CAP HAVING A VENT

BACKGROUND OF THE INVENTION

This invention relates to caps for liquid tanks and, more particularly, to caps for liquid tanks, such as fuel tanks for internal combustion engines, which caps have an internal vent system.

Some liquid storage tanks, such as fuel tanks for internal combustion engines, require some sort of system for venting the interior of the tank to atmosphere so that the liquid can be withdrawn from the tank without creating a vacuum condition which can cause stoppage of the liquid flow. This venting often can be provided most conveniently by incorporating a vent system into the cap used for closing the filler neck on the tank because the filler neck usually is located on the top of the tank and is connected to the highest point of the air space in the tank.

When fuel tank caps including an integral vent system are used on outboard motors, it is desirable to provide some means for selectively closing the vent system in order to prevent fuel from leaking from the fuel tank when the motor or tank is removed from the boat. Also, it is desirable to provide some sort of means for preventing sloshing fuel from leaking through the vent during normal operation or when the motor or tank is tilted.

Examples of prior art constructions of fuel tank caps having an integral vent system are disclosed in the following United States patents:

2,666,550 Armstrong et al issued Jan. 19, 1954
2,800,245 Doyle et al issued July 23, 1957

SUMMARY OF THE INVENTION

The invention provides a cap for a liquid tank having a filler neck, which cap includes a hollow body having a top wall portion for closing the filler neck and a depending annular flange for releasably engaging the filler neck, a diaphragm having a lowermost portion with respect to the interior of the tank disposed inside the body and spaced inwardly from the top wall portion to define a chamber therebetween, a vent port in the top wall portion for communicating the chamber with the atmosphere, a closure member mounted on the top wall portion for movement between a first position to close the vent port and a second position to open the vent port, and means associated with the lowermost portion of the diaphragm for communicating the interior of the tank with the chamber so as to vent the tank to atmosphere when the closure member is in the second position and for draining fluid collected in the chamber back into the tank.

In one embodiment, the cap includes a retainer means having a portion adapted to extend through the filler neck and to be located inside the tank for retaining the cap on the tank while permitting the cap to be completely removed from and moved away from the filler neck for filling of the tank.

In one embodiment, the closure member includes a shaft portion mounted on the top wall portion for axial movement relative to the top wall portion between the first and second positions and a cover portion connected to the outer end of the shank portion for selectively closing and opening the vent port in response to movement of the shank portion between the first and second positions.

In one embodiment, the closure member shank portion has an inner end portion which extends through the lowermost portion of the diaphragm and includes means for providing a fluid passage between the interior of the tank and the chamber.

In one embodiment, the retainer means includes an elongated stem which has an upper end connected to the inner end of the closure member shank portion and is adapted to extend through the filler neck and into the tank when the cap is installed on the filler neck and a transversely extending member which has a length greater than the inside dimension of the filler neck and is connected to the lower end of the stem.

In one embodiment, the invention provides a cap for an outboard motor fuel tank having a filler neck, which cap includes a hollow body having a top wall portion for closing the filler neck and a depending annular flange for releasably engaging the filler neck, a vent port in the top wall portion for communicating the chamber with the atmosphere, a closure member having a shank portion which is mounted on the top wall for relative axial movement and has an inner end portion including at least one axially extending slot in the outer surface thereof and having a cover portion connected to the outer end of the shank portion for common axial movement therewith between a first position to close the vent port and a second position to open the vent port, and a diaphragm disposed inside the body and spaced inwardly from the top wall portion to define a chamber therebetween. The diaphragm has a lowermost portion with respect to the interior of the tank when the motor or tank is in an upright operating position and receives the inner end portion of the closure member shank portion, whereby the slot or slots in the shank portion ccommunicate(s) the interior of the fuel tank with the chamber for venting the fuel tank to atmosphere when the closure member is in the second or open position and for draining fuel collected in the chamber back into the tank when the motor or tank is in the upright position.

One of the principal features of the invention is the provision of a cap for a liquid tank having a filler neck, such as an outboard motor fuel tank, which cap includes an integral venting system for selectively venting the interior of the tank to atmosphere.

Another of the principal features of the invention is the provision of such a cap including a vent port and means for selectively opening and closing the vent port.

A further of the principal features of the invention is the provision of a cap of the type described in the two preceding paragraphs including means for minimizing spillage of liquid from the tank through the vent port.

A further of the principal features of the invention is the provision of a cap of the type described in the three preceding paragraphs including means for preventing unintentional complete detachment of the cap from the tank.

A further of the principal features of the invention is the provision of a cap for a liquid tank having a filler neck, which cap includes a top wall portion for closing the filler neck, a shank portion depending from the top wall portion and including a socket in the inner end thereof, and a retainer including an elongated stem having an enlarged, generally spherical portion received in the shank socket and further including a traversely extending member connected to the lower end of the stem and having a length greater than the inside dimension of the filler neck.

Other features and advantages of the embodiments of the invention will become apparent to those skilled in the art upon reviewing the following detailed description, the drawing and the appended claims.

Figure 1:
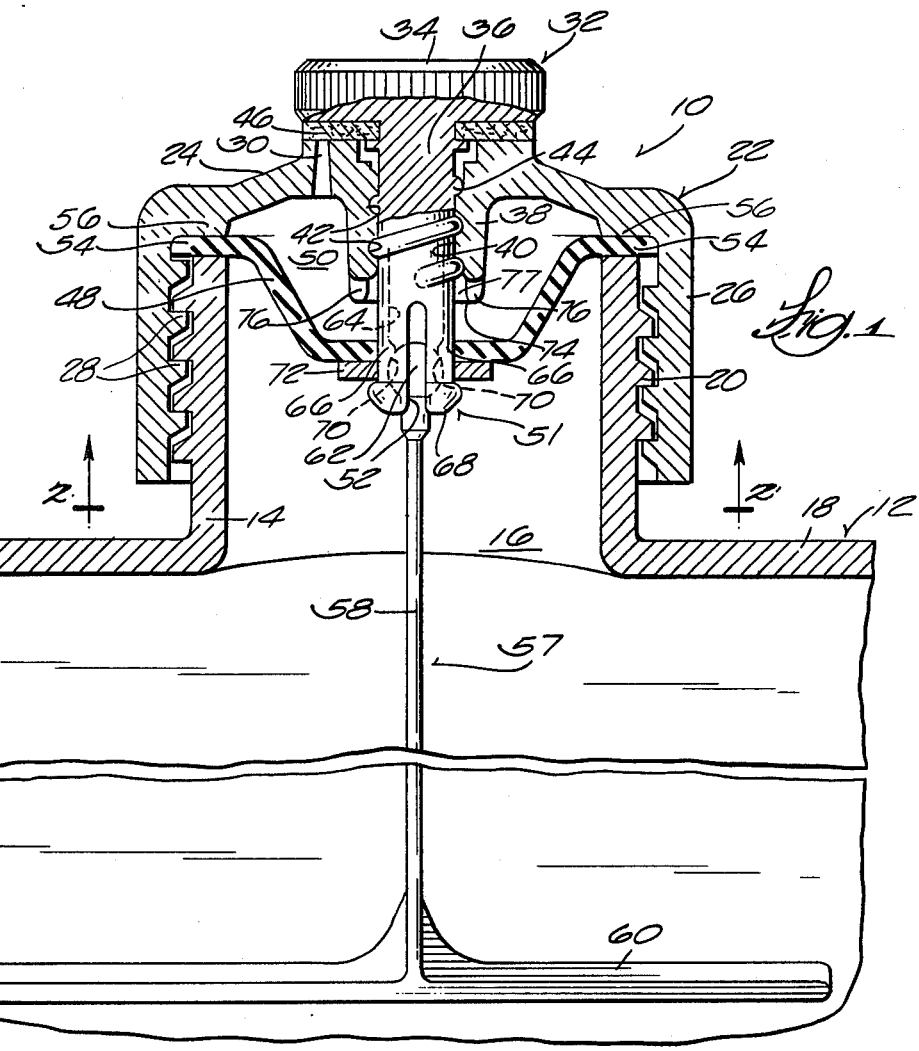
FIG. 1 is a side elevational, partially sectioned and partially broken away view of a cap embodying various of the features of the invention, shown installed on a fuel tank of an outboard motor.
Figure 2:
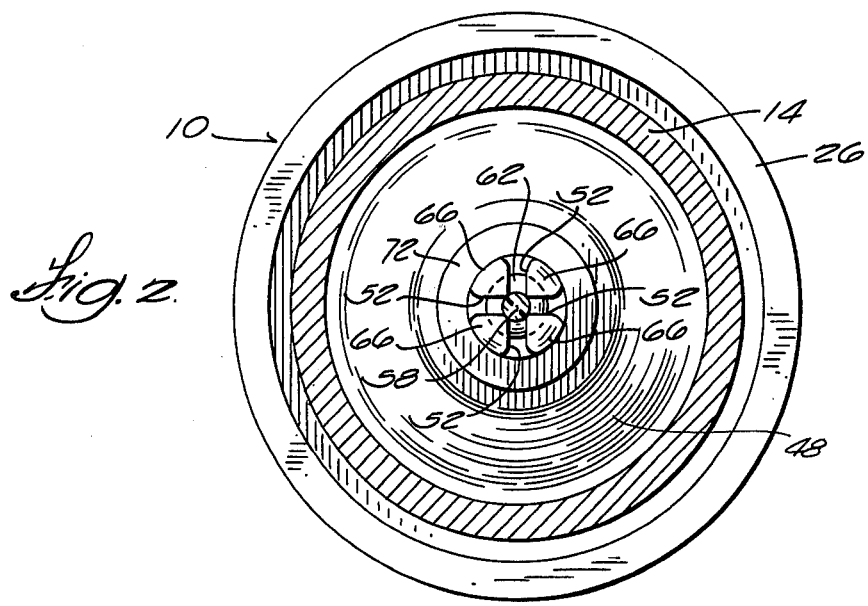
FIG. 2 is a view taken generally along line 2—2 in FIG. 1.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawing is a tank cap 10 which embodies various of the features of the invention and which is shown mounted on a fuel tank 12 (illustrated fragmentarily) of an outboard motor. In the specific construction illustrated, the fuel tank 12 includes a cylindrical or annular filler neck 14 extending outwardly from an opening 16 in the top wall 18 of the fuel tank 12. The filler neck 12 is provided with means for receiving and releasably locking the cap 10 thereon. While various arrangements can be used, in the specific construction illustrated, such means includes providing external threads 20 on the outer end portion of the filler neck 14.

The cap 10 includes a hollow body 22 having an outer or top wall portion 24 for closing the filler neck 14 and a cylindrical or annular skirt or flange 26 depending from the top wall portion 24 and including an internally threaded portion 28 which is threadably received on the threaded portion 20 of the filler neck 14 to releasably lock the cap 10 on the filler neck 14. The outer surface of the flange 26 is formed in a conventional manner, e.g., provided with knurls or flat surfaces, to facilitate gripping for twisting the cap 10 on and off the filler neck 14.

One or more vent ports 30 (one shown) are provided in the top wall portion 24 for venting the interior of the fuel tank 12 to the atmosphere as described below. Means are provided for selectively opening the vent port 30, such as when venting of the fuel tank 12 is desired during operation of the outboard motor, and closing the vent port 30, such as when the tank 12 or the outboard motor is to be removed from the boat. While various arrangements can be used, in a specific construction illustrated, such means includes a closure member 32 mounted on the top wall portion 24 for movement relative to the top wall portion 24 between a first or closed position shown in FIG. 1 to close the vent port 30 and a second or open position spaced from the first position to open the vent port 30.

More specifically, the closure member 32 includes a laterally extending, generally circular cover 34 and a cylindrical shank 36 depending from the cover 34. Depending from the central portion of the top wall portion 24 is a boss 38 including a central bore 40 receiving the shank 36 of the closure member 32 for axial movement relative to the boss 38, and thus axial movement of the cover 34 relative to the top wall portion 24, between the first and second positions.

In the specific construction illustrated, this axial movement of the closure member 32 is effected by providing the boss bore 40 with internal threads 42 and by providing the closure member shank 36 with an externally threaded portion 44 which is threadably received in the threads 42 of the boss 38. The outer surface of the closure member cover 34 is formed in a suitable manner, e.g., provided with knurls, to facilitate gripping for rotating or turning the closure member 32 between the closed and open positions. An annular gasket 46 carried by the closure member 32 adjacent the underside of the cover assures positive sealing of the vent port 30 when the closure member 32 is in the first or closed position illustrated in FIG. 1.

Disposed inside the body 22 to minimize leakage of fuel through the vent port 30 is a diaphragm 48 made from a flexible material which is substantially inert to gasoline, e.g., rubber, and is spaced from the top wall portion 24 to define a fuel collection chamber 50. Associated with the diaphragm 48 for connecting the fuel collection chamber 50 in fluid communication with the interior of the fuel tank 12 is one or more fluid passages. In the specific construction illustrated, the inner end portion 51 of the closure member shank 36 extends through the central portion of the diaphragm 48 and includes a plurality of circumferentially spaced, axially extending slots 52 which serve as such fluid passages.

When the closure member 32 is moved to the second or open position by rotating or turning the cover 34, the interior of the fuel tank 12 is vented to atmosphere via the slots 52, the fuel collection chamber 50, and the vent port 30. The diaphragm 48 acts as a baffle to minimize flow of fuel from the fuel tank 12 toward the vent port 30, such as when the tank 12 is tilted or the outboard motor is tilted to a raised position. Any fuel which happens to flow past the diaphragm 48 through the slots 52 tends to collect in the fuel collection chamber 50, rather than leaking through the vent port 30 when it is open, and drains from the fuel collection chamber 50 through the slots 52 back into the fuel tank 12 when the tank 12 or the outboard motor is returned to a normal upright operating position. In order to more effectively serve this latter function, the diaphragm 48 preferably is formed in the dish-like shape illustrated so as to promote drainage of fuel towards the lowermost or central portion thereof and the inner end portion 51 of closure member shank 36 extends through the central portion of the diaphragm 48.

The outer peripheral portion 54 of the diaphragm 48 preferably extends radially outwardly beyond the upper edge of the filler neck 14 and is carried adjacent an annular shoulder 56 provided inside the body 22 near the innermost flange thread 28 so it is sealingly clamped between the upper edge of the filler neck 14 and the shoulder 56 when the cap 10 is tightened onto the filler neck 12 as shown in FIG. 1 and thereby serves as a gasket.

Means preferably are provided for retaining the cap 10 on the fuel tank 12 and yet permitting the cap 10 to be completely removed from and moved away from the filler neck 14 for filling of the fuel tank. While various arrangements can be used, in the specific construction illustrated, such means comprises a cap retainer 57 including an elongated stem 58 having an upper end connected to the inner end portion 51 of the closure member shank 36 and a traversely or laterally extending member 60 fixably connected to the lower end of the stem 58. The lateral member 60 has a length somewhat greater than the diameter of the opening 16 in the filler neck 14 so that, when the cap 10 is removed from the filler neck 14 and the stem 58 is pulled upwardly through the filler neck 14, the lateral member 60 engages the top wall 18 of the fuel tank 12 to prevent the cap 10 from being unintentionally completely detached from the fuel tank 12.

Provided on the upper end of the stem 48 for connecting the cap retainer 57 to the closure member shank 36 is an enlarged, generally spherical portion 62 which is received in an axially extending recess 64 provided in the inner end portion 51 of the shank 26. The slots 52 in the shank 36 open into the recess 44 to form a plurality of resilient fingers 66. Each of the fingers 66 terminate in an enlarged end portion 68 and includes an internal, generally concave portion 70. The finger concave portions 70 cooperate to form a seat or socket for the spherical portion 62 of the stem 58. The fingers 66 are held against the spherical portion 62 of the stem 58 by an annular locking ring 72 slidably mounted on the shank 36.

Located in the innermost surface 74 of the boss 38 is one or more notches 76 which are arranged to provide a vent passage from the interior of the fuel tank 12 into the fuel collection chamber 50 via the slots 52 in the event the closure member 32 is turned out to a position where the diaphragm 48 bottoms against the inner end surface 74 of the boss 38. The inner end portion of the boss 38 includes an interior, annular recess 77 which communicates with the notch or notches 76 and with the slots 52 and thereby insures positive venting, when the diaphragm 48 is bottomed against the boss 38, regardless of the angular location of the slots 52 relative to the notch or notches 76.

The body 22, the closure member 32, and the cap retainer 57, preferably are formed from an inexpensive synthetic material which is substantially inert to gasoline in order to minimize fabrication and assembly costs and to provide a cap assembly which is resistant to corrosion and will not scratch the outer surface of the fuel tank 12 or other engine parts upon installation or removal. These parts most preferably are fabricated from a synthetic thermoplastic material so they can be conveniently formed by conventional low-cost molding techniques without the need for any subsequent machining. If desired, the locking ring 72 also can be formed from the same type material as the body 22, the closure member 32, and the cap retainer 57.

For assembly, the closure member 32 is threaded into the boss 38 and the diaphragm 48 is slipped over the inner end portion 51 of closure member shank 36. The locking ring 72 is then mounted on the inner end 51 of the shank 36 prior to installing the cap retainer 57. As the inner wall of the locking ring 74 is moved into engagement with the enlarged end portions 68 of the fingers 66, the resilient nature of the fingers 66 permit them to be flexed radially inwardly so that the locking ring 74 can be snapped over the end portions 68 of the fingers 66 and slipped onto the shank 36. After the locking ring 74 has been so mounted on the shank 36, it is slipped upwardly thereon past the internal concave portions 70 so that the fingers 66 can be spread apart far enough to permit the spherical portion 62 of the stem 58 to be inserted between the fingers 66. After the spherical portion 62 of the stem 58 have been moved into place, the locking ring 74 is slipped downwardly on the shank 36 to the position illustrated wherein it holds the fingers 66 in pivotal engagement with the spherical portion 62 of the stem 58.

For initial installation of the cap 10 on the fuel tank 12, the lateral member 60 of the cap retainer 57 is inserted into the opening of the filler neck 14 in a cocked position and has sufficient flexure to permit it to be forced through the filler neck 14 into the interior of the fuel tank 12.

Various of the features of the invention are set forth in the following claims:

What is claimed is:

1. A cap for a liquid tank having a filler neck, said cap comprising a hollow body having a top wall portion for closing the filler neck and an annular flange depending from said top wall portion for releasably engaging the filler neck, a diaphragm disposed inside said body and spaced inwardly from said top wall portion to define a chamber therebetween, said diaphragm having a lowermost portion relative to the interior of the tank, a vent port in said top wall portion for communicating said chamber with the atmosphere, a closure member mounted on said top wall portion for selective reciprocative movement relative to said top wall portion between a first position to close said vent port and a second position to open said vent port, and means associated with said diaphragm lowermost portion and communicating the interior of the tank with said chamber for venting the tank to atmosphere when said closure member is in the second position and for draining liquid collected in said chamber back into the tank.

2. A cap according to claim 1 including retainer means connected to said cap and having a portion adapted to extend through the filler neck and be located inside the tank for retaining said cap on the tank and permitting said cap to be completely removed from and moved away from the filler neck for filling of the tank.

3. A cap according to claim 1 wherein said closure means includes a shaft portion mounted on said top wall portion for axial movement relative to said top wall portion between the first and second positions and having an outer end, and a cover portion connected to said shank portion outer end for selectively closing and opening said vent port in response to movement of said shank portion between the first and second positions.

4. A cap according to claim 3 wherein said closure member shank portion has an inner end portion extending through said lowermost portion of said diaphragm and including means for providing a fluid passage between the interior of the tank and said chamber.

5. A cap according to claim 4 wherein said body includes a boss depending from said top wall portion and having a central bore including an internally threaded portion, and said closure member shank portion includes an externally threaded portion threadably engaged with said threaded portion of said boss bore.

6. A cap according to claim 4 including retainer means connected to said inner end portion of said closure member shank portion and having a portion adapted to extend through the filler neck and be located inside the tank for retaining said cap on the tank and permitting said cap to be completely removed from and moved away from the filler neck for filling of the tank.

7. A cap according to claim 6 wherein said retainer means includes an elongated stem having an upper end and a lower end adapted to extend through the filler neck and into the tank when said flange is engaged with the filler neck, a transversely extending member having a length greater than the inside dimension of the filler neck opening connected to said lower end of said stem, and means connecting said upper end of said stem to said inner end portion of said closure member shank portion.

8. A cap according to claim 7 wherein said upper end of said stem includes an enlarged, generally spherical portion, and said inner end portion of said closure member shank portion includes an axially extending recess adapted to serve as a socket for said spherical portion of said stem.

9. A cap according to claim 8 wherein said inner end portion of said closure member shank portion extends past said diaphragm and includes a plurality of circumferentially spaced, axially extending slots which provide said fluid passage and open into said recess to define a plurality of resilient fingers, said fingers defining said socket for said spherical portion of said stem.

10. A cap according to claim 9 wherein each of said fingers has an enlarged outer end portion, and said cap includes an annular locking ring slidably mounted over said fingers to hold said fingers in engagement with said spherical portion of said stem.

11. A cap according to claim 4 including means connecting said diaphragm to said closure member shank portion, wherein said inner end portion of said closure member shank portion extends past said diaphragm and includes at least one axially extending slot which provides said fluid passage and wherein said boss has an inner end portion including an innermost surface which is spaced from said diaphragm when said closure member is in the first position and has at least one notch, and further including an interior annular recess communicating with said notch and with said slot for connecting the interior of the tank in communication with said chamber, in the event said diaphragm engages said innermost surface of said boss during movement of said closure member from the first position, regardless of the angular location of said slot relative to said notch.

12. A cap for an outboard motor fuel tank having a filler neck, said cap comprising a hollow body having a top wall portion for closing the filler neck and an annular flange depending from said top wall portion for releasably engaging the filler neck, a vent port in said top wall portion communicating said chamber with the atmosphere, a closure member having a shank portion which is mounted on said top wall portion for axial movement relative to said top wall portion, which has an outer end, and which has an inner end portion including at least one axially extending slot in the outer surface thereof, said closure member also having a cover portion which is connected to said outer end of said shank portion for common axial movement therewith between a first position to close said vent port and a second position to open said vent port, and a diaphragm disposed inside said body and spaced inwardly from said top wall portion to define a chamber therebetween, said diaphragm having a lowermost portion with respect to the interior of the fuel tank when the tank is in an upright position and receiving said inner end portion of said closure member shank portion, whereby said slot communicates the interior of the tank with said chamber for venting the fuel tank to atmosphere through said vent port when said closure member is in the second position and for draining fuel collected in said chamber back into the fuel tank when the tank is in the upright position.

13. A cap according to claim 12 wherein said closure member is threadably mounted in said top wall portion.

14. A cap according to claim 12 including a cap retainer connected to said inner end portion of said closure member for retaining said cap on the tank and permitting said cap to be completely removed from and moved away from the filler neck for filling of the tank, said cap retainer including an elongated stem which has an upper end connected to said inner end portion of said closure member shank portion, which has a lower end, and which is adapted to extend into the fuel tank when said cap is installed on the filler neck, and a transversely extending member having a length greater than the inside diameter of the filler neck and connected to said lower end of said stem.

15. A cap according to claim 14 wherein said upper end of said stem includes an enlarged generally spherical portion, and said inner end portion of said closure member shank portion extends past said diaphragm and includes an axially extending recess and a plurality of said slots which are circumferentially spaced and open into said recess to define a plurality of resilient fingers defining a socket for receiving said spherical portion of said stem.

16. A cap according to claim 15 wherein each of said fingers has an enlarged outer end portion, and further including an annular locking ring slidably mounted over said fingers to hold said fingers in engagement with said spherical portion of said stem.

17. A cap according to claim 16 wherein said body, said closure member, and said cap retainer member are molded from a synthetic plastic material.

18. A cap for a liquid tank having a filler neck, said cap comprising a top wall portion for closing the filler neck, a shank portion depending from said top wall portion and having an inner end portion including a recess and a plurality of circumferentially spaced slots which open into said recess to define a plurality of resilient fingers defining an internal socket, and a cap retainer connected to said shank inner end portion for retaining said cap on the tank and permitting said cap to be completely removed from and moved away from the filler neck for filling of the tank, said cap retainer including an elongated stem which has an upper end including an enlarged, generally spherical portion received in said shank socket, which has a lower end, and which is adapted to extend into the fuel tank when said cap is installed on the filler neck, and a transversely extending member having a length greater than the inside diameter of the filler neck and connected to said lower end of said stem.

19. A cap according to claim 18 wherein each of said fingers has an enlarged outer end portion, and further including an annular locking ring slidably mounted over said fingers to hold said fingers in engagement with said spherical portion of said stem.

* * * * *